US012783663B2

(12) United States Patent
Zhang

(10) Patent No.: US 12,783,663 B2
(45) Date of Patent: Nov. 3, 2026

(54) METHOD, ELECTRONIC DEVICE, AND COMPUTER PROGRAM PRODUCT FOR DETECTING NETWORK ATTACK

(71) Applicant: Dell Products L.P., Round Rock, TX (US)

(72) Inventor: Weibing Zhang, Beijing (CN)

(73) Assignee: Dell Products L.P., Round Rock, TX (US)

(*) Notice: Subject to any disclaimer, the term of this patent is extended or adjusted under 35 U.S.C. 154(b) by 177 days.

(21) Appl. No.: 18/136,518

(22) Filed: Apr. 19, 2023

(65) Prior Publication Data

US 2024/0330457 A1 Oct. 3, 2024

(30) Foreign Application Priority Data

Mar. 31, 2023 (CN) ......................... 202310341023.8

(51) Int. Cl.
*G06F 21/56* (2013.01)
*G06F 21/55* (2013.01)

(52) U.S. Cl.
CPC .......... *G06F 21/565* (2013.01); *G06F 21/554* (2013.01)

(58) Field of Classification Search
CPC ............................. G06F 21/565; G06F 21/554
See application file for complete search history.

(56) References Cited

U.S. PATENT DOCUMENTS 8,099,605 B1 * 1/2012 Billsrom ................. H04L 69/40 726/28
8,112,633 B1 * 2/2012 Clyde ................... G06F 21/645 713/176

(Continued)

FOREIGN PATENT DOCUMENTS

WO WO-2020111504 A1 * 6/2020 ............. G06F 21/56

OTHER PUBLICATIONS

Microsoft, "SMB Compression," https://learn.microsoft.com/en-us/windows-server/storage/file-server/smb-compression, Sep. 2, 2022, 8 pages.

(Continued)

*Primary Examiner* — Shewaye Gelagay
*Assistant Examiner* — Samikshya Poudel
(74) *Attorney, Agent, or Firm* — Ryan, Mason & Lewis, LLP

(57) ABSTRACT

Embodiments of the present disclosure provide a method, an electronic device, and a computer program product for detecting a network attack. The method includes determining a compression ratio of written data in a time window of a predetermined time length, where the compression ratio is a ratio of a data amount of the written data before being compressed to a data amount of the written data after being compressed. The method further includes determining a user side connection associated with the written data at least according to determining that the compression ratio is less than a threshold compression ratio. In addition, the method includes determining data from the user side connection as a network attack according to determining that files associated with the user side connection cannot pass a file integrity check. Embodiments of the present disclosure can significantly reduce the computational amount of network attack detection.

18 Claims, 5 Drawing Sheets

(56) References Cited

U.S. PATENT DOCUMENTS

| | | | | |
|---|---|---|---|---|
| 8,166,548 | B2 * | 4/2012 | Saika | G06F 21/566 710/52 |
| 11,748,475 | B1 * | 9/2023 | Berk | G06F 21/564 726/22 |
| 2004/0059834 | A1 * | 3/2004 | Taylor | H04L 69/04 713/151 |
| 2008/0224906 | A1 * | 9/2008 | Plamondon | H03M 7/30 341/76 |
| 2011/0277026 | A1 * | 11/2011 | Agarwal | H04L 63/0815 726/8 |
| 2012/0243551 | A1 * | 9/2012 | Afek | H04L 63/1416 370/412 |
| 2014/0115703 | A1 * | 4/2014 | Penton | G06F 21/554 726/23 |
| 2018/0159866 | A1 * | 6/2018 | Sheri | G06F 21/566 |
| 2020/0042707 | A1 * | 2/2020 | Kucherov | G06F 3/0683 |
| 2020/0099699 | A1 * | 3/2020 | Saad | G06F 11/2076 |
| 2020/0404044 | A1 * | 12/2020 | Dey | H04L 67/141 |
| 2021/0182397 | A1 * | 6/2021 | Karnik | H04W 12/122 |
| 2021/0314377 | A1 * | 10/2021 | Shribman | H04L 67/02 |
| 2023/0023584 | A1 * | 1/2023 | Sternfeld | G06F 21/554 |
| 2023/0418942 | A1 * | 12/2023 | Lovmand | G06F 21/566 |

OTHER PUBLICATIONS

R. Braden, “FTP Data Compression,” Network Working Group, Request for Comment: 468, https://datatracker.ietf.org/doc/html/rfc468, Mar. 8, 1973, 7 pages.

Linux, “Linux Manual Page, ”BSD General Commands Manual SFTP(1), https://www.man7.org/linux/man-pages/man1/sftp.1.html, Sep. 19, 2022, 10 pages.

IBM, “When Should I Compress Data for Encryption?” https://www.ibm.com/docs/en/zos/2.4.0?topic=data-when-should-i-compress-encryption, Apr. 8, 2021, 2 pages.

Stack Exchange Network, “Encryption and Compression of Data,” https://security.stackexchange.com/questions/19969/encryption-and-compression-of-data, Accessed Dec. 30, 2022, 4 pages.

* cited by examiner

METHOD, ELECTRONIC DEVICE, AND COMPUTER PROGRAM PRODUCT FOR DETECTING NETWORK ATTACK

RELATED APPLICATION

The present application claims priority to Chinese Patent Application No. 202310341023.8, filed Mar. 31, 2023, and entitled "Method, Electronic Device, and Computer Program Product for Detecting Network Attack," which is incorporated by reference herein in its entirety.

FIELD

Embodiments of the present disclosure relate to the field of computer networks, and more specifically, to a method, an electronic device, and a computer program product for detecting a network attack.

BACKGROUND

Currently, network attacks such as ransomware attacks have become a major threat to user data security for data storage servers. Data storage servers are often targets of ransomware attacks. Because a typical ransomware virus only encrypts data and the encrypted data content is random, traditional antivirus methods often cannot detect activities of a ransomware virus. More and more variants of ransomware attacks make detection of ransomware activities more difficult. Current ransomware detection is typically performed at a storage object or even a system level, and when a ransomware attack is detected, all access to the storage server is usually blocked. Although taking periodic snapshots is a good practice for protecting data, it is nonetheless unduly difficult for a storage system to detect ransomware attacks, and so snapshots may be automatically replaced when a retention period limit is reached, even in cases in which a ransomware attack may be in progress. Accordingly, if ransomware activities cannot be detected in a timely manner, potential data loss caused by ransomware attacks remains unacceptably high.

SUMMARY

Embodiments of the present disclosure provide a method, an electronic device, and a computer program product for detecting a network attack.

In a first aspect of the present disclosure, a method for detecting a network attack is provided. The method includes determining a compression ratio of written data in a time window of a predetermined time length, where the compression ratio is a ratio of a data amount of the written data before being compressed to a data amount of the written data after being compressed. The method further includes determining a user side connection associated with the written data at least according to determining that the compression ratio is less than a threshold compression ratio. In addition, the method includes determining data from the user side connection as a network attack according to determining that files associated with the user side connection cannot pass a file integrity check.

In a second aspect of the present disclosure, an electronic device is provided, including at least one processor and a memory coupled to the at least one processor and having instructions stored therein, wherein the instructions, when executed by the at least one processor, cause the electronic device to perform actions including: determining a compression ratio of written data in a time window of a predetermined time length, wherein the compression ratio is a ratio of a data amount of the written data before being compressed to a data amount of the written data after being compressed; determining a user side connection associated with the written data at least according to determining that the compression ratio is less than a threshold compression ratio; and determining data from the user side connection as a network attack according to determining that files associated with the user side connection cannot pass a file integrity check.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, from which the above and other objectives, features, and advantages of the present disclosure will become more apparent. Identical or similar reference numbers generally represent identical or similar components in the example embodiments of the present disclosure. In the accompanying drawings.

DETAILED DESCRIPTION

Figure 1:
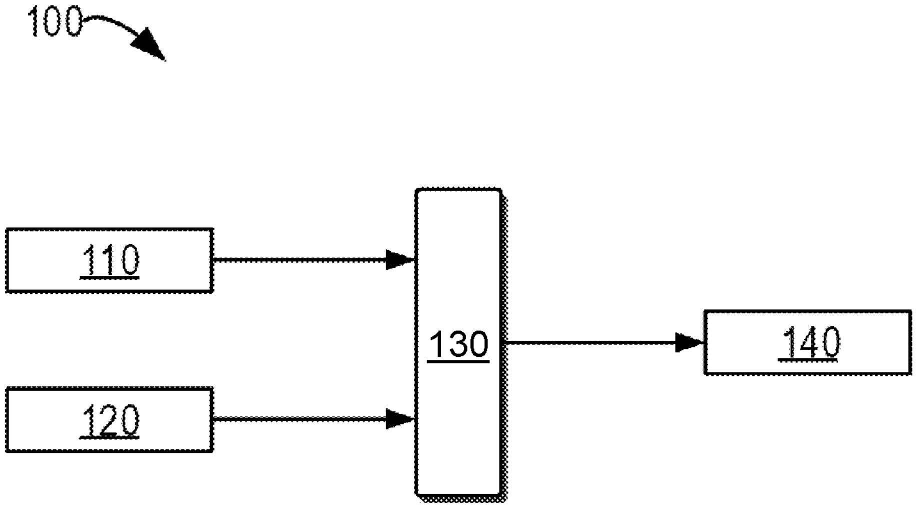
FIG. 1 shows a schematic diagram of an example environment according to embodiments of the present disclosure.

Principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "a set of example embodiments." The term "another embodiment" indicates "a group of other embodiments." The terms "first," "second," and the like may refer to different or identical objects. Other explicit and implicit definitions may also be included below.

As discussed earlier, data storage service providers may face network attack behaviors such as ransomware when providing users with secure and stable data storage services. Ransomware is malicious software that prevents users from accessing computer files, systems, or networks maintained by data storage service providers, and demands that users pay ransom for access. Therefore, such network attacks may lead to costly operational disruptions and loss of critical information and data.

For example, NAS (Network Attached Storage) servers are common targets of ransomware attacks, as they are typically used to maintain important shared files for users. In a past period, there have been increasing reports of attackers successfully encrypting data on NAS servers and demanding ransom payments. The ransomware on infected user devices will replace files in a shared folder with a key-encrypted version controlled by an attacker. After the file encryption and replacement are completed, users will not be able to access the files unless they pay a ransom for a decryption key. To avoid such incidents, it is necessary to detect such network attacks.

Due to the fact that activities of ransomware typically only include operations such as reading, writing, creating, and deleting files, the behavior of ransomware is not easily detected. Various new variants of ransomware make detecting ransomware attacks more difficult. In addition, since data written by ransomware is encrypted random data, and the encrypted data content is random, a traditional IDS (intrusion detection system) cannot effectively detect it. Although a file integrity check, in some cases, can detect ransomware attacks, continuously scanning all files in a storage system to perform such checks is a very expensive performance cost for the storage system itself.

In addition, there are also some entropy-based ransomware detection methods. However, these methods typically rely on backend support for entropy calculation. In other words, these detection methods require computing power to perform functions related to entropy calculation (such as compression or deduplication) to obtain data entropy. However, in addition to a problem of high-performance costs, such method also makes it difficult to find an attack source of the ransomware because it only focuses on existing data in the storage server.

In addition, snapshots can provide users with an accessible data copy from an earlier time point, so snapshots can be used to minimize the threat of ransomware encryption. In other words, if users have snapshots that are not affected by ransomware encryption, they can obtain a copy of the data from the snapshots to get rid of ransomware. However, snapshots may be automatically deleted due to space thresholds or expiration of snapshot retention periods. Therefore, for shared folders encrypted by ransomware, even if data is protected by snapshots, if network attacks cannot be detected in a timely manner, useful snapshots may still be deleted.

In order to solve, at least in part, the above and other potential problems, embodiments of the present disclosure provide a novel solution for detecting a network attack. Because current data storage servers utilize a data compression mechanism to improve actual data transmission throughput, data analysis can be performed on a compression ratio of written data in a period of time. When an amount of data that cannot be compressed in the written data is large, it indicates that the written data is likely to be encrypted on a large scale. At this time, it can be preliminarily determined that the written data is executing a network attack, and a file integrity check is performed on a data source of the written data. In this way, illustrative embodiments of the present disclosure can significantly reduce the computational amount of network attack detection and accurately detect a user side connection initiating the network attack. Therefore, the entire detection process does not affect operations of other users and improves the user experience.

FIG. 1 shows a schematic diagram of an example environment 100 according to embodiments of the present disclosure. In the example environment 100, a device and/or process according to embodiments of the present disclosure can be implemented. As shown in FIG. 1, the example environment 100 may include written data 110 in a time window of a predetermined time length, historical data 120 in one or more time windows before the time window, a computing device 130, and a detection result 140 of whether the written data 110 is at least a part of a network attack.

It should be understood that the computing device 130 is configured to analyze the written data 110. Specifically, the written data 110 is compressed during a transmission process, and is often decompressed before being saved to a server. Therefore, a data amount of the written data 110 before being decompressed by a data decompression module is generally less than a data amount after being decompressed by the data decompression module. For encrypted written data, because its data entropy increases, the data amount before being decompressed by the data decompression module is almost equal to the data amount after being decompressed by the data decompression module. By means of the phenomenon, the computing device 130 may monitor the written data input to the data decompression module and the written data output by the data decompression module. For example, the computing device 130 may compare a compression ratio of the written data 110 with a compression ratio of the historical data 120. When the compression ratio of the written data 110 is less than the compression ratio of the historical data 120, it indicates that the written data 110 may be a part of the network attack. At least based on this, the computing device 130 can generate the detection result 140. Specifically, the network attack detection solution will be described in detail below.

In some embodiments, the computing device 130 may be any device with computing capability. As a non-limiting example, the computing device may be any type of fixed computing device, mobile computing device, or portable computing device, including but not limited to a desktop computer, a laptop computer, a notebook computer, a netbook computer, a tablet computer, and the like. All or part of the components of the computing device may be distributed in a cloud. The computing device and the nodes connected thereto may also adopt a cloud-edge architecture.

It should be understood that FIG. 1 is intended only to illustrate some concepts of the present disclosure and is not intended to limit the scope of the present disclosure.

A process for detecting a network attack according to embodiments of the present disclosure will be described in detail with reference to FIG. 2 below. For the convenience of understanding, specific data mentioned in the following description is exemplary and is not intended to limit the protection scope of the present disclosure. It should be understood that embodiments described below may also include additional actions not shown and/or may omit actions shown, and the scope of the present disclosure is not limited in this regard.

Figure 2:
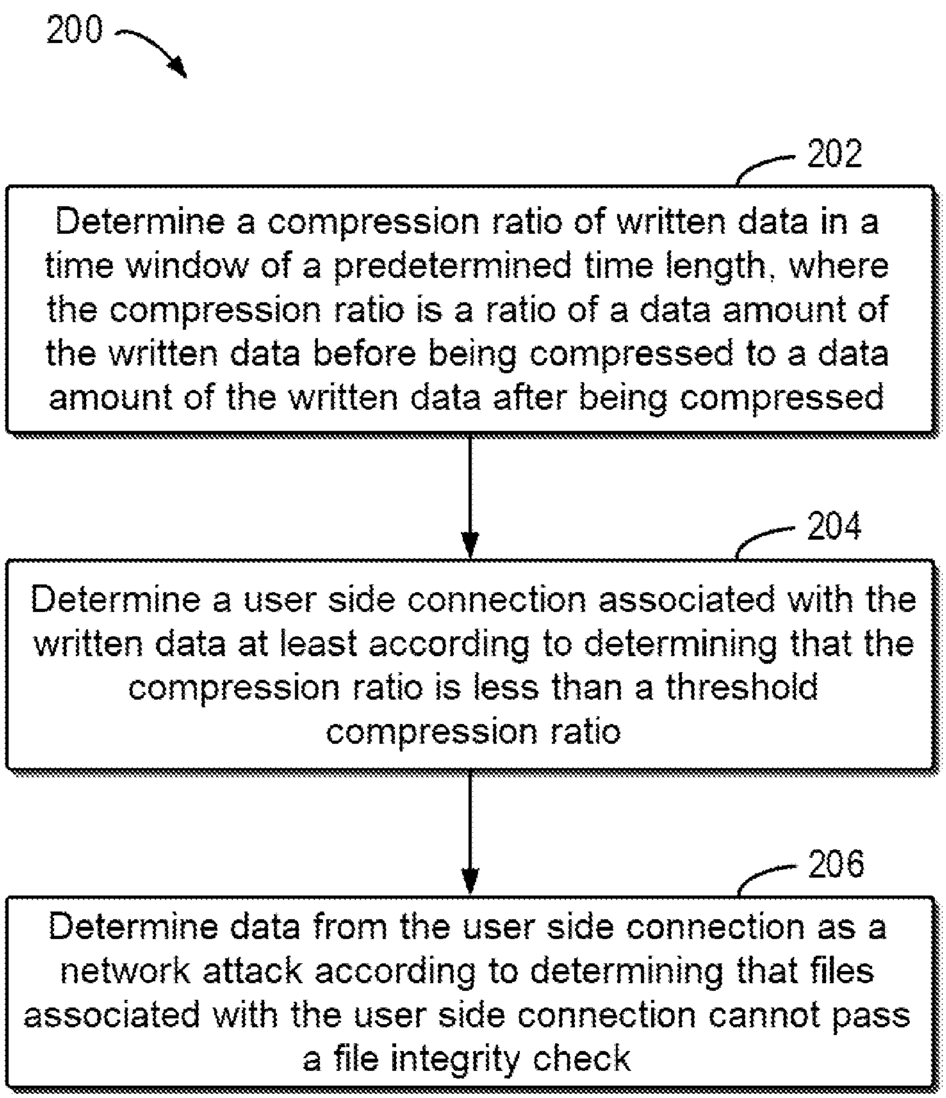
FIG. 2 shows a flow chart of a process for detecting a network attack according to embodiments of the present disclosure.

FIG. 2 shows a flow chart of a process 200 for detecting a network attack according to embodiments of the present disclosure. In some embodiments, the process 200 may be implemented in the computing device 130 of FIG. 1. The process 200 for detecting a network attack according to embodiments of the present disclosure is described now with reference to FIG. 2. For ease of understanding, specific examples mentioned in the following description are illustrative and are not intended to limit the protection scope of the present disclosure.

As shown in FIG. 2, at 202, the computing device 130 may determine a compression ratio of the written data 110 with a time window of a predetermined time length. The compression ratio is a ratio of a data amount of the written data 110 before being compressed to a data amount of the written data 110 after being compressed. It should be understood that "after being compressed" described in this text is used to indicate that the data has undergone processing by a data compression/decompression module, and even if certain data cannot be further compressed, it can still continue to undergo processing by a data compression module. In other words, the amount of data that cannot be further compressed remains basically unchanged after being processed by the data compression module compared to the data amount before being processed by the data compression module. Moreover, "the data before being compressed" can be understood as original data, and "the data after being compressed" can be understood as compressed data. In addition, the solution for detecting a network attack of the present disclosure can be applied to the SMB protocol or other compression protocols such as FTP or SFTP. It should be understood that FTP, SFTP, and SMB support protocol layer compression with connection level compression.

At 204, if the computing device 130 determines that the compression ratio is less than a threshold compression ratio, the computing device 130 can further determine a user side connection associated with the written data 110. In other words, the compression ratio is less than the threshold compression ratio, which means that at least most data in the written data 110 is encrypted. At this time, it can be preliminarily determined that the written data 110 may be at least a part of the network attack, and the user side connection or the user device associated with the written data 110 may have been controlled by an attacker's ransomware.

Figure 3:
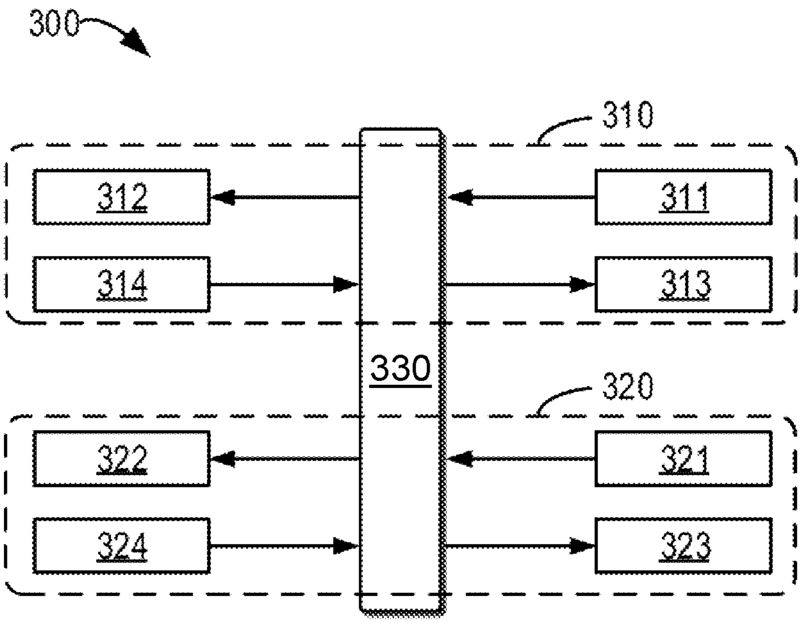
FIG. 3 shows a schematic diagram of an example environment regarding a data compression/decompression module according to embodiments of the present disclosure.

It should be understood that to more accurately detect the network attack, in some embodiments, while monitoring the compression ratio of the written data 110, further analysis can be conducted on read data and operational records of these data. FIG. 3 shows a schematic diagram of an example environment 300 regarding a data compression/decompression module 330 according to embodiments of the present disclosure. In FIG. 3, the computing device 130 is configured to analyze written data and read data of different user side connections so as to detect the network attack.

In some embodiments, the computing device 130 may determine an additional compression ratio of read data in the time window. The additional compression ratio is a ratio of a data amount of the read data before being compressed to a data amount of the read data after being compressed. It should be understood that a time length of "the time window" herein is equal to a predetermined time length in the above text.

As shown in FIG. 3, for a user side connection 310, the computing device 130 may determine a data amount 311 (a data amount of original data) of the read data in the current time window before being compressed by the data compression/decompression module 330, a data amount 312 (a data amount of compression data) of the read data after being compressed by the data compression/decompression module 330, a data amount 314 (the data amount of the compression data) of written data in the time window before being decompressed, and a data amount 313 (the data amount of the original data) of the written data after being decompressed. Correspondingly, for the user side connection 320, the computing device 130 may determine a data amount 321 (the data amount of the original data) of the read data in the current time window before being compressed, a data amount 322 (the data amount of the compression data) of the read data after being compressed, a data amount 324 (the data amount of the compression data) of the written data in the time window before being decompressed, and a data amount 323 (the data amount of the original data) of the written data after being decompressed. Based on these data, the computing device 130 may determine the compression ratio of the written data in the time window and the additional compression ratio of the read data in the time window.

In some embodiments, the computing device 130 may respectively compare the compression ratio with the additional compression ratio and the compression ratio with the threshold compression ratio. If the compression ratio is less than the additional compression ratio and the compression ratio is less than the threshold compression ratio, the computing device 130 may determine that the user side connection associated with the written data may be an attacker. As an example, in FIG. 3, if the compression ratio of the user side connection 310 in the time window is basically the same as the additional compression ratio and the compression ratio is basically the same as the threshold compression ratio, it can be determined that the written data on the user side connection 310 is normal data. If the compression ratio of the user side connection 320 in the time window is less than the additional compression ratio and the compression ratio is less than the threshold compression ratio, it can be determined that the written data on the user side connection 320 may be a network attack.

Figure 4:
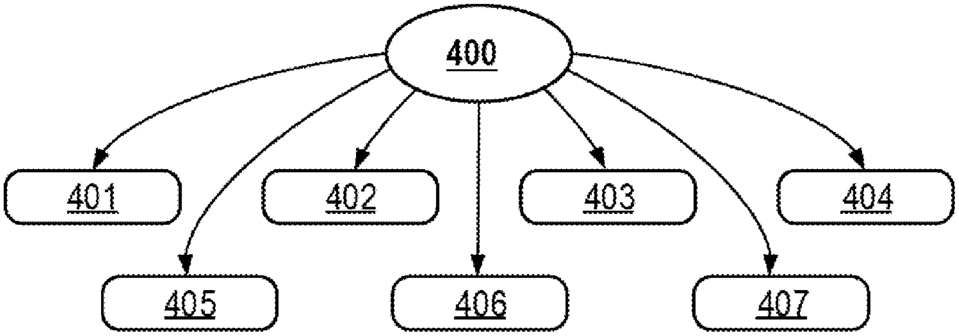
FIG. 4 shows a schematic diagram of a protocol instruction according to embodiments of the present disclosure.

It should be understood that to more accurately detect a network attack, in some embodiments, while monitoring the compression ratio of the written data and the additional compression ratio of the read data, it is also possible to analyze the operation records of these data. It should be understood that a protocol layer is usually configured with multiple protocol instructions to represent various operations of users on data. FIG. 4 shows a schematic diagram of a protocol instruction 400 according to embodiments of the present disclosure.

As shown in FIG. 4, the protocol instruction 400 may include the following operations executed on files: open 401, set attributes 402, truncate 403, close 404, read 405, write 406, and remove 407. It should be understood that these operations are all common operations, and the protocol instruction 400 can also include other operations. It should also be understood that a file sharing protocol implements the structure and language of file requests between a user side and a server, thereby providing instructions for opening, reading, writing, and closing files over the network. For a network attack, a common operation sequence is: creating a file, and writing high entropy data to the same file identifier; and deleting the file after reading the same file identifier. Therefore, when the file deletion operation after the file reading operation and/or a file encryption operation after a file creation operation occurs multiple times within a time window, it can be basically determined that the user side connection is used to implement a network attack.

In some embodiments, the computing device 130 may determine a to-be-analyzed data set based on the data in the time window. As an example, a structure of the data set is shown in the following Table 1.

TABLE 1

| Connection *connection, | user side connection identifier |
|---|---|
| uitn64_t ingress_in | data amount of written compression data |
| uint64_t ingress_out | data amount of written original data |
| uitn64_t egress_in | data amount of read compression data |
| uint64_t egress_out | data amount of read original data |
| File_Ops *op_list | file operation list |

Returning to FIG. 2, at 206, the computing device 130 may perform a file integrity check on a file associated with the determined user side connection. If the file associated with the user side connection cannot pass the file integrity check, the computing device 130 may determine data from the user side connection as a network attack.

Figure 5:
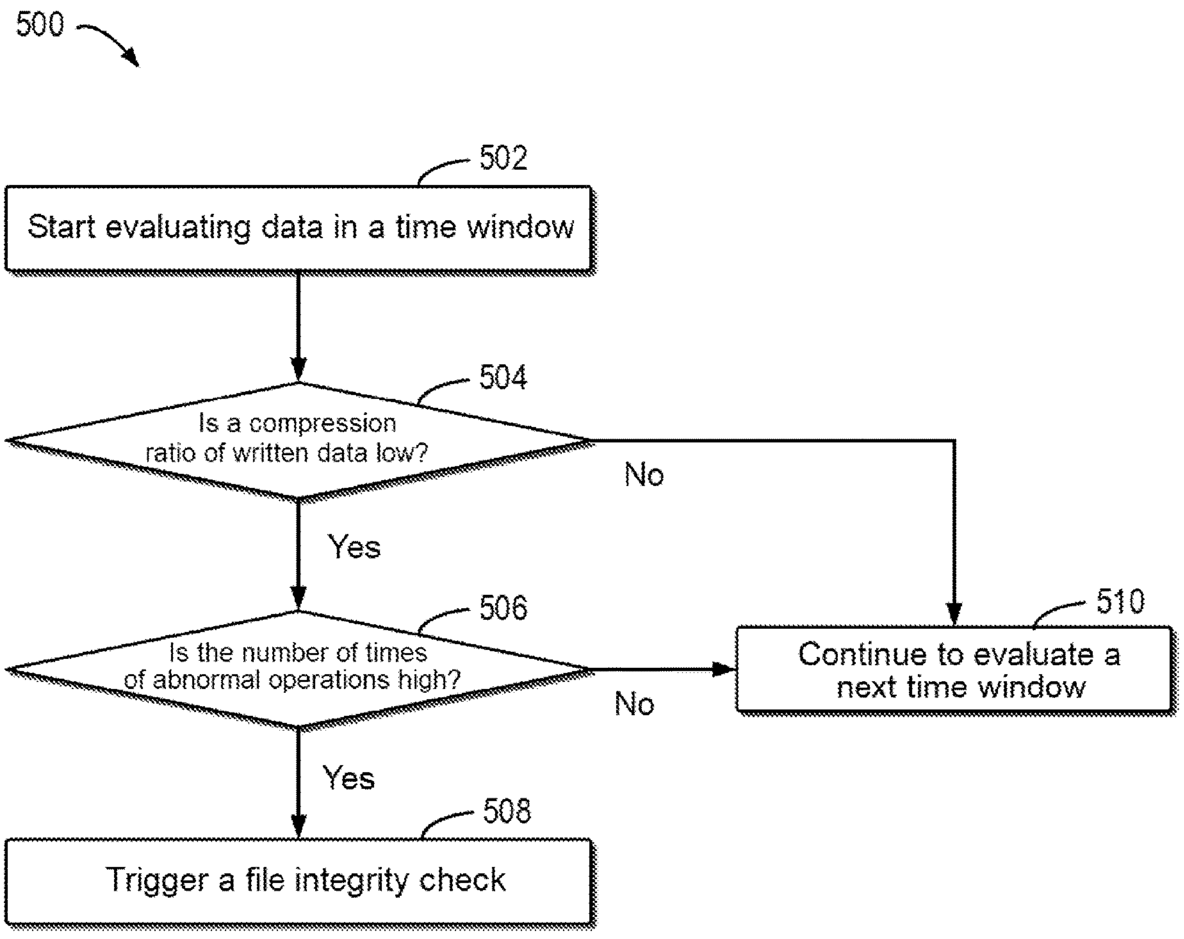
FIG. 5 shows a flow chart of a process for detecting a network attack according to embodiments of the present disclosure.

FIG. 5 shows a flow chart of a process 500 for detecting a network attack according to another embodiment of the present disclosure. In some embodiments, the process 500 can be implemented in the computing device 130 in FIG. 1. The process 500 for detecting a network attack according to embodiments of the present disclosure is now described with reference to FIG. 5. For ease of understanding, specific examples mentioned in the following description are all illustrative and are not intended to limit the protection scope of the present disclosure.

At 502, the computing device 130 starts evaluating data in the time window. It should be understood that the time length of "the time window" herein may be equal to the predetermined time length.

At 504, the computing device 130 may analyze written data in the time window, for example, to determine whether a compression ratio of the written data in the time window is relatively low. As an example, the compression ratio of the written data is compared with a threshold compression ratio. If the compression ratio of the written data is less than the threshold compression ratio, the process moves to 506. Otherwise, the compression ratio indicates that the written data is not a network attack, and the computing device 130 can continue to evaluate a next time window at 510.

At 506, the computing device 130 may further analyze the written data in the time window, for example, to determine whether the number of times of abnormal operations in the time window is relatively high, where the "number of times of abnormal operations" generally refers to the number of detected instances of abnormal operations in the time window, or in other words, the number of abnormal operations that are determined to occur in the time window.

As an example, the number of times of the abnormal operations may be compared with the threshold number of times. If the number of times of the abnormal operations is greater than the threshold number of times, the computing device 130 may determine that the user side connection associated with the written data may be an attack source, and the process then moves to 508. Otherwise, the number of times of abnormal operations indicates that the written data is not a network attack, and the computing device 130 may continue to evaluate a next time window at 510. In some embodiments, in order to determine the number of the abnormal operations, the computing device 130 may determine a first count of file deletion operations after a file reading operation in the time window, and determine a second count of file encryption operations after a file creation operation in the time window. Further, based on at least one of the first count and the second count, the computing device 130 may determine the number of times of the abnormal operations.

At 508, the computing device 130 can trigger a file integrity check. File integrity checks typically require computational effort, but due to the fact that the aforementioned data analysis process will only apply file integrity checks to some of the user side connections that may be network attacks, computational effort is saved on the whole.

In some embodiments, if the user side connection initiating the network attack is found by means of the file integrity check, the computing device 130 can block the user side connection and save historical snapshots associated with the user side connection or create snapshots associated with the user side connection. In this way, it can prevent snapshots from being removed in a timely manner, making it easier for users to recover data in the future without being ransomed by network attacks. A scenario of data analysis will be described below in detail with reference to FIG. 6.

Figure 6:
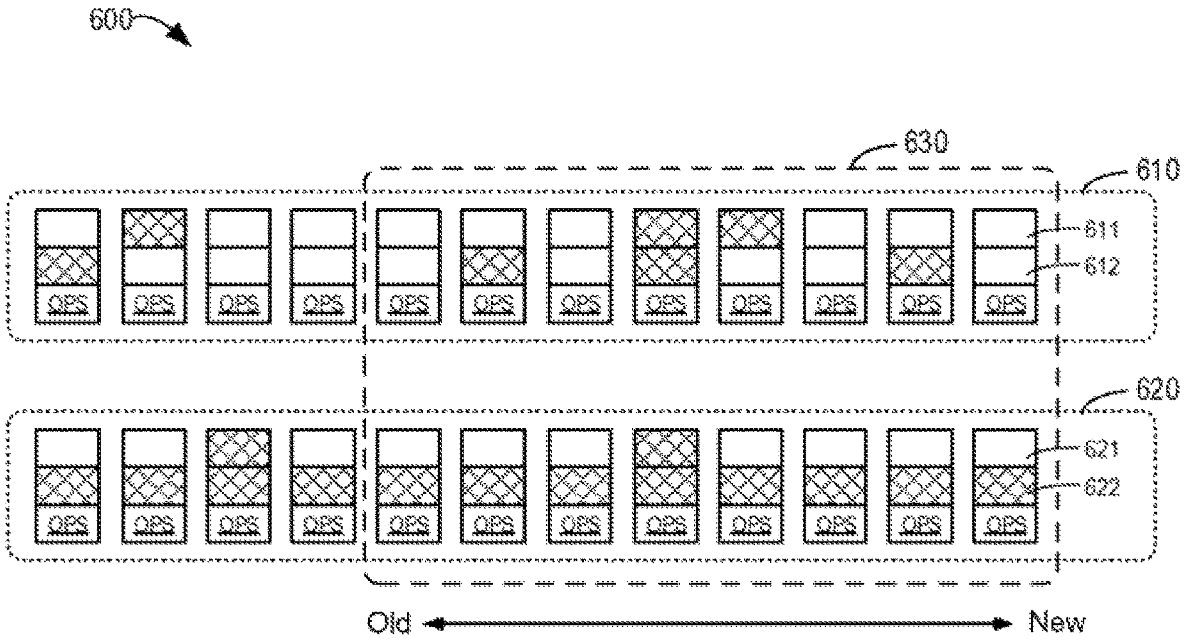
FIG. 6 shows a schematic diagram of an example environment of data in a time window according to embodiments of the present disclosure.

FIG. 6 shows a schematic diagram of an example environment 600 of data in a time window according to embodiments of the present disclosure. As shown in FIG. 6, the example environment 600 includes a user side connection 610 and a user side connection 620, and the two user side connections both include data sets in the above Table 1. For the purpose of presentation clarity, the data closer to the right side of FIG. 6 is newer, and the data closer to the left side of FIG. 6 is older. In addition, it should be understood that pattern squares in FIG. 6 are used to represent high entropy data (i.e., data that cannot be further compressed), while blank squares are used to represent normal data.

As an example, data 611 can include a data amount of written compression data and a data amount of written original data, and a compression ratio of the written data can thus be determined. Correspondingly, data 612 can include a data amount of read compression data and a data amount of read original data, and an additional compression ratio of the read data can be determined. Similarly, data 621 can include a data amount of written compression data and a data amount of written original data, and a compression ratio of the written data can thus be determined. Moreover, data 622 can include a data amount of read compression data and a data amount of read original data, and an additional compression ratio of the read data can thus be determined. In addition, the data operations ("OPS") can be used to represent a list of file operations for the data.

Based on the above data set, the computing device 130 can perform network attack detection on a time window 630. For example, for the user side connection 610, because a compression ratio of written data in the time window 630 is substantially the same as an additional compression ratio of read data, it can be determined that there are no network attack. For the user side connection 620, because the compression ratio of the written data in the time window 630 is far less than the additional compression ratio of the read data, and if it is still determined in the data OPS that the number of times of abnormal operations is too large, it can be determined that there may be a network attack on the user side connection 620. Further, a file integrity check can be performed on the user side connection 620. In addition, the computing device 130 can also determine probabilities of each user side connection being associated with network attacks based on the dataset in the time window 630. The above operation records and the compression ratio can be used to reflect file operations and IO modes from the user side connection.

By means of the above embodiments, the present disclosure can implement network attack detection without enabling an entropy calculation function. This allows a storage system to easily apply the detection method of the present disclosure without requiring significant computational effort. In addition, because the network attack detection of the present disclosure is based on statistical data of the user side connection level, the network connection used by an attacker can be identified, and the user side connection can then be blocked, while other connections can still access the storage server at the same time.

Figure 7:
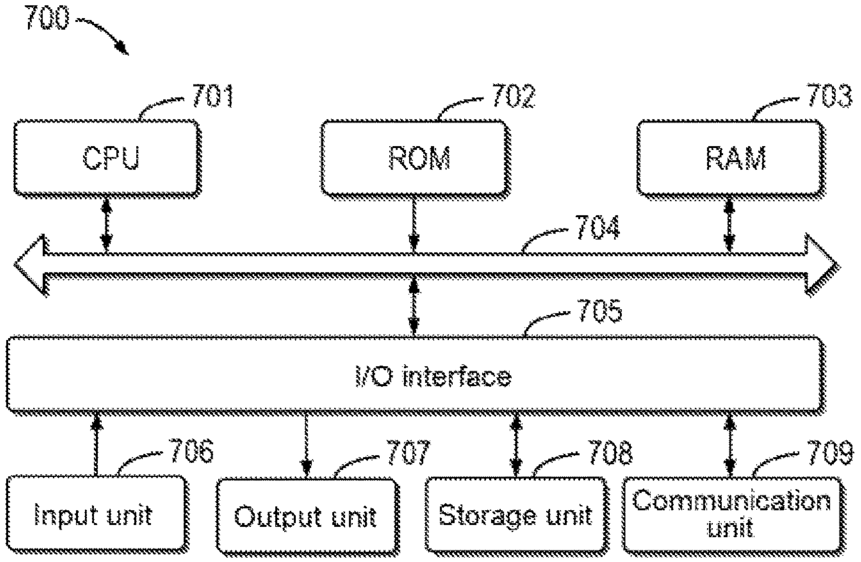
FIG. 7 shows a block diagram of an example device that can be used to implement embodiments of the present disclosure.

FIG. 7 shows a block diagram of an example device 700 that can be used to implement embodiments of the present disclosure. For example, the device 700 may be used to implement the computing device 130 shown in FIG. 1. As shown in the drawing, the device 700 includes a central processing unit (CPU) 701 which may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The CPU 701 performs the various methods and processing described above, such as processes 200 and 500. For example, in some embodiments, the various methods and processing described above may be implemented as a computer software program or a computer program product, which is tangibly included in a machine-readable medium, such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more steps of any process described above may be implemented. Alternatively, in other embodiments, the CPU 701 may be configured in any other suitable manner (for example, by means of firmware) to perform a process such as processes 200 and 500.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations will be apparent to persons of ordinary skill in the art without departing from the scope and spirit of the illustrated embodiments. The selection of terms used herein is intended to best explain the principles and practical applications of illustrative embodiments and their associated technical improvements, so as to enable persons of ordinary skill in the art to understand the embodiments disclosed herein.

What is claimed is:

1. A method, comprising:

receiving, from a user device, compressed written data in a processor-based ransomware detection system, wherein the written data is compressed as part of a transmission process, the transmission process including (i) compression performed in conjunction with transmission of the compressed written data from the user device, by executing one or more compression instructions of a designated file transfer protocol to perform connection level compression, on a per-connection basis for each of a plurality of distinct connections, in a protocol layer and (ii) decompression performed in conjunction with reception of the compressed written data in the processor-based ransomware detection system, by executing one or more decompression instructions of the designated file transfer protocol to perform connection level decompression in the protocol layer, wherein the connection level compression and the connection level decompression are part of the same designated file transfer protocol, and are performed separately on the per-connection basis for each of the plurality of distinct connections;

executing, on at least one processor of the processor-based ransomware detection system, the one or more decompression instructions of the designated file transfer protocol, to decompress the received compressed written data to determine a data amount of the written data before compression;

determining, in the processor-based ransomware detection system, a compression ratio of the compressed written data in a time window of a predetermined time length, wherein the compression ratio is a ratio of the data amount of the written data before compression, as determined by the executing of the one or more decompression instructions of the designated file transfer protocol to decompress the received compressed written data in the processor-based ransomware detection system, to a data amount of the written data after being compressed, as determined from the received compressed written data;

determining, in the processor-based ransomware detection system and based on the compression ratio of the compressed written data and an additional compression ratio determined for read data in the same time window for which the compression ratio of the compressed written data was determined, a connection associated with the written data and the read data at least in part by (i) determining that the compression ratio of the compressed written data is less than a threshold compression ratio, by comparing the compression ratio of the compressed written data to the threshold compression ratio, (ii) determining that the compression ratio of the compressed written data is less than the additional compression ratio determined for the read data in the same time window, by comparing the compression ratio of the compressed written data to the additional compression ratio determined for the read data in the same time window, and (iii) identifying the connection at least in part responsive to the compression ratio of the compressed written data being less than the threshold compression ratio and less than the additional compression ratio determined for the read data in the same time window;

performing, in the processor-based ransomware detection system, a file integrity check on one or more files associated with the connection;

determining, in the processor-based ransomware detection system, that data received from the connection is part of a network attack according to determining that the one or more files associated with the connection cannot pass the file integrity check; and initiating one or more actions in the processor-based ransomware detection system to mitigate the network attack, wherein the one or more actions initiated to mitigate the network attack comprise blocking the connection.

2. The method according to claim 1, wherein determining the connection associated with the written data and the read data comprises:

in response to the compression ratio of the compressed written data being less than the threshold compression ratio, determining a number of abnormal operations in the time window; and in response to the number of abnormal operations being greater than a threshold, determining the connection associated with the written data and the read data.

3. The method according to claim 2, wherein determining the number of abnormal operations in the time window comprises:

determining a first count of instances of file deletion operations occurring after respective corresponding instances of file reading operations in the time window;

determining a second count of instances of file encryption operations occurring after respective corresponding instances of file creation operations in the time window; and determining the number of abnormal operations based on at least one or both of the first count and the second count.

4. The method according to claim 1, wherein the additional compression ratio is a ratio of a data amount of the read data before compression to a data amount of the read data after compression.

5. The method according to claim 1, further comprising:

determining the threshold compression ratio based on a compression ratio of historical written data from a plurality of preceding time windows each having the predetermined time length.

6. The method according to claim 1, wherein the one or more actions initiated to mitigate the network attack further comprise at least one of:

saving to a storage device a historical snapshot associated with the connection; and creating a snapshot associated with the connection.

7. The method according to claim 1, wherein the network attack is a ransomware attack.

8. An electronic device, comprising:

at least one processor; and memory coupled to the at least one processor and having instructions stored therein, wherein the instructions, when executed by the at least one processor, cause the electronic device to perform actions comprising:

receiving, from a user device, compressed written data in a processor-based ransomware detection system of the electronic device, wherein the written data is compressed as part of a transmission process, the transmission process including (i) compression performed in conjunction with transmission of the compressed written data from the user device, by executing one or more compression instructions of a designated file transfer protocol to perform connection level compression, on a per-connection basis for each of a plurality of distinct connections, in a protocol layer and (ii) decompression performed in conjunction with reception of the compressed written data in the processor-based ransomware detection system, by executing one or more decompression instructions of the designated file transfer protocol to perform connection level decompression in the protocol layer, wherein the connection level compression and the connection level decompression are part of the same designated file transfer protocol, and are performed separately on the per-connection basis for each of the plurality of distinct connections;

executing, on at least one processor of the processor-based ransomware detection system, the one or more decompression instructions of the designated file transfer protocol, to decompress the received compressed written data to determine a data amount of the written data before compression;

determining, in the processor-based ransomware detection system, a compression ratio of the compressed written data in a time window of a predetermined time length, wherein the compression ratio is a ratio of the data amount of the written data before compression, as determined by the executing of the one or more decompression instructions of the designated file transfer protocol to decompress the received compressed written data in the processor-based ransomware detection system, to a data amount of the written data after being compressed, as determined from the received compressed written data;

determining, in the processor-based ransomware detection system and based on the compression ratio of the compressed written data and an additional compression ratio determined for read data in the same time window for which the compression ratio of the compressed written data was determined, a connection associated with the written data and the read data at least in part by (i) determining that the compression ratio of the compressed written data is less than a threshold compression ratio, by comparing the compression ratio of the compressed written data to the threshold compression ratio, (ii) determining that the compression ratio of the compressed written data is less than the additional compression ratio determined for the read data in the same time window, by comparing the compression ratio of the compressed written data to the additional compression ratio determined for the read data in the same time window, and (iii) identifying the connection at least in part responsive to the compression ratio of the compressed written data being less than the threshold compression ratio and less than the additional compression ratio determined for the read data in the same time window;

performing, in the processor-based ransomware detection system, a file integrity check on one or more files associated with the connection;

determining, in the processor-based ransomware detection system, that data received from the connection is part of a network attack according to determining that the one or more files associated with the connection cannot pass the file integrity check; and initiating one or more actions in the processor-based ransomware detection system to mitigate the network attack, wherein the one or more actions initiated to mitigate the network attack comprise blocking the connection.

9. The electronic device according to claim 8, wherein determining the connection associated with the written data and the read data comprises:

in response to the compression ratio of the compressed written data being less than the threshold compression ratio, determining a number of abnormal operations in the time window; and in response to the number of abnormal operations being greater than a threshold, determining the connection associated with the written data and the read data.

10. The electronic device according to claim 9, wherein determining the number of abnormal operations in the time window comprises:

determining a first count of instances of file deletion operations occurring after respective corresponding instances of file reading operations in the time window;

determining a second count of instances of file encryption operations occurring after respective corresponding instances of file creation operations in the time window; and determining the number of abnormal operations based on at least one or both of the first count and the second count.

11. The electronic device according to claim 8, wherein the additional compression ratio is a ratio of a data amount of the read data before compression to a data amount of the read data after compression.

12. The electronic device according to claim 8, further comprising:

determining the threshold compression ratio based on a compression ratio of historical written data from a plurality of preceding time windows each having the predetermined time length.

13. The electronic device according to claim 8, wherein the one or more actions initiated to mitigate the network attack further comprise at least one of:

saving to a storage device a historical snapshot associated with the connection; and creating a snapshot associated with the connection.

14. The electronic device according to claim 8, wherein the network attack is a ransomware attack.

15. A computer program product comprising a non-transitory computer-readable medium having machine-executable instructions stored therein, wherein the machine-executable instructions, when executed by a machine, cause the machine to perform actions comprising:

receiving, from a user device, compressed written data in a processor-based ransomware detection system of the machine, wherein the written data is compressed as part of a transmission process, the transmission process including (i) compression performed in conjunction with transmission of the compressed written data from the user device, by executing one or more compression instructions of a designated file transfer protocol to perform connection level compression, on a per-connection basis for each of a plurality of distinct connections, in a protocol layer and (ii) decompression performed in conjunction with reception of the compressed written data in the processor-based ransomware detection system, by executing one or more decompression instructions of the designated file transfer protocol to perform connection level decompression in the protocol layer, wherein the connection level compression and the connection level decompression are part of the same designated file transfer protocol, and are performed separately on the per-connection basis for each of the plurality of distinct connections;

executing, on at least one processor of the processor-based ransomware detection system, the one or more decompression instructions of the designated file transfer protocol, to decompress the received compressed written data to determine a data amount of the written data before compression;

determining, in the processor-based ransomware detection system, a compression ratio of the compressed written data in a time window of a predetermined time length, wherein the compression ratio is a ratio of the data amount of the written data before compression, as determined by the executing of the one or more decompression instructions of the designated file transfer protocol to decompress the received compressed written data in the processor-based ransomware detection system, to a data amount of the written data after being compressed, as determined from the received compressed written data;

determining, in the processor-based ransomware detection system and based on the compression ratio of the compressed written data and an additional compression ratio determined for read data in the same time window for which the compression ratio of the compressed written data was determined, a connection associated with the written data and the read data at least in part by (i) determining that the compression ratio of the compressed written data is less than a threshold compression ratio, by comparing the compression ratio of the compressed written data to the threshold compression ratio, (ii) determining that the compression ratio of the compressed written data is less than the additional compression ratio determined for the read data in the same time window, by comparing the compression ratio of the compressed written data to the additional compression ratio determined for the read data in the same time window, and (iii) identifying the connection at least in part responsive to the compression ratio of the compressed written data being less than the threshold compression ratio and less than the additional compression ratio determined for the read data in the same time window;

performing, in the processor-based ransomware detection system, a file integrity check on one or more files associated with the connection;

determining, in the processor-based ransomware detection system, that data received from the connection is part of a network attack according to determining that the one or more files associated with the connection cannot pass the file integrity check; and initiating one or more actions in the processor-based ransomware detection system to mitigate the network attack, wherein the one or more actions initiated to mitigate the network attack comprise blocking the connection.

16. The computer program product according to claim 15, wherein determining the connection associated with the written data and the read data comprises:

in response to the compression ratio of the compressed written data being less than the threshold compression ratio, determining a number of abnormal operations in the time window; and in response to the number of abnormal operations being greater than a threshold, determining the connection associated with the written data and the read data.

17. The computer program product according to claim 16, wherein determining the number of abnormal operations in the time window comprises:

determining a first count of instances of file deletion operations occurring after respective corresponding instances of file reading operations in the time window;

determining a second count of instances of file encryption operations occurring after respective corresponding instances of file creation operations in the time window; and determining the number of abnormal operations based on at least one or both of the first count and the second count.

18. The computer program product according to claim 15, wherein the additional compression ratio is a ratio of a data amount of the read data before compression to a data amount of the read data after compression.

* * * * *